United States Patent [19]
Wall et al.

[11] Patent Number: 5,506,969
[45] Date of Patent: Apr. 9, 1996

[54] METHOD AND APPARATUS FOR BUS BANDWIDTH MANAGEMENT

[75] Inventors: Gerard A. Wall, San Jose; James G. Hanko, Redwood City; J. Duane Northcutt, Sunnyvale, all of Calif.

[73] Assignee: Sun Microsystems, Inc., Mountain View, Calif.

[21] Appl. No.: 158,887

[22] Filed: Nov. 29, 1993

[51] Int. Cl.⁶ .................................................. G06F 13/362
[52] U.S. Cl. ........................................... 395/287; 395/292
[58] Field of Search .................................. 395/325, 425, 395/375, 163; 370/85.15

[56] References Cited

U.S. PATENT DOCUMENTS

| | | | |
|---|---|---|---|
| 4,373,183 | 2/1983 | Means et al. | 395/304 |
| 4,688,168 | 8/1987 | Gudaitis et al. | 364/200 |
| 4,982,400 | 1/1991 | Ebersole | 370/85.15 |
| 5,099,470 | 3/1992 | Barlow et al. | 395/325 |
| 5,113,494 | 5/1992 | Menendez et al. | 395/163 |
| 5,218,680 | 6/1993 | Farrell et al. | 395/325 |
| 5,247,627 | 9/1993 | Murakami et al. | 395/375 |
| 5,249,279 | 9/1993 | Schmenk et al. | 395/425 |
| 5,388,288 | 2/1995 | Heath et al. | 395/325 |

FOREIGN PATENT DOCUMENTS

| | | | |
|---|---|---|---|
| 0332417 | 9/1989 | European Pat. Off. | G06F 13/36 |

OTHER PUBLICATIONS

Archons Project Technical Report, published Jan. 21, 1988, author: J. Duane Northcutt, entitled: The Alpha Operating System: Requirements and Rationale.

IBM Technical Disclosure Bulletin, vol. 35, No. 5, Oct. 1992, "Extended Micro Channel For Realtime Multimedia Applications", pp. 8–10.

*Primary Examiner*—Jack B. Harvey
*Assistant Examiner*—David A. Wiley
*Attorney, Agent, or Firm*—Blakely Sokoloff Taylor & Zafman

[57] ABSTRACT

A computer system includes bus bandwidth management for operation of a high-speed bus. The high-speed bus is coupled to a plurality of modules. A plurality of client applications operate on the computer system, and request services from the high-speed bus to transfer data from a source module to at least one destination module. The bus bandwidth management system contains a bus manager, a dispatcher, a global controller, and a local controller contained on each module. Transfer requests for data transfer on the high-speed bus are made from the client applications to the bus manager. The bus manager takes the requested information and, based on a bus management policy management in effect, schedules a transfer order for the transfer requests. The bus manager then transfers the ordered transfer requests to the dispatcher. The dispatcher decomposes the ordered transfer requests into individual bus transfer operations. For each individual bus transfer operation, the dispatcher loads a command packet into the global controller, the source module, and the destination module(s). After the dispatcher dispatches all individual bus transfer operations, the dispatcher returns to the bus manager to receive the next transfer request. The global controller executes the individual bus transfer operations in the transfer order.

21 Claims, 9 Drawing Sheets

1

METHOD AND APPARATUS FOR BUS BANDWIDTH MANAGEMENT

BACKGROUND OF THE INVENTION

1. Field of the Invention

The present invention relates to data processing in a computer system, and more specifically to methods and apparatus for bus bandwidth management for a high-speed bus.

2. Art Background

In general, computer systems contain a central processing unit (CPU), memory, peripheral components, and an input/output interface to couple the peripheral components or subsystems to the CPU. Typically, computer buses are used for transferring data among the computer subsystems. In multi-tasking computer systems, a number of application programs, or client applications, are resident simultaneously. Because computers systems contain a limited amount of resources, client applications compete for use of the computer resources. For example, clients compete for use of the CPU cycles. Likewise, clients also share use of the computer buses. Typically, in order to allocate use of the computer buses, computer systems employ bus arbitration systems to allocate use of the bus to the various client applications. The bus arbitration systems are implemented in hardware, and therefore exhibit rigid policy considerations for allocation of bus resources.

One policy for allocating bus resources to a number of client applications in bus arbitration systems is known as "first come, first serve" (FCFS). The FCFS policy is based on fairness, such that the first client to request use of the bus receives total use of the bus until relinquished by the requesting client. Another policy employed in bus arbitration systems is a round robin policy. The round robin policy, also based on fairness, selects a single client for bus allocation in a sequential order. If a selected client application does not require bus services, then the bus arbitration hardware selects the next client in the sequential order. Although such fairness-based policies may provide adequate performance in certain client applications, the fairness policies are insufficient for others. Specifically, the fairness policies fail to provide a high degree of performance when there are timeliness requirements associated with the client requests for bus services.

In recognition that not all clients should receive equal allocation of bus resources, some bus arbitration systems employ static priority policies. In a static priority bus allocation policy, each client application competing for use of the bus has a priority attribute associated with its request for bus services. Typically, the priority attribute consists of a number representing the priority of the request. With use of the static priority policy, when a number of requests are made for bus resources, the bus arbitration system selects the client with the highest priority. Although the static priority provides improved performance over the fairness-based policies for some applications, the static priority policy also fails to account for timeliness characteristics associated with the client requests.

With an increasing number of multi-media applications for computer systems, a number of applications require integration of digital audio and video into the computer system environment. Digital audio and video data are characterized as time-critical media. In general, time-critical media comprises data streams that are consumed by the human sensory system, and therefore the value in delivering the data stream depends on timing of the presentation, as well as on the accuracy of the data streams. If time-critical media are not presented with the proper timing, the data can lose most, or all, of its informational content for the human consumer. For example, significant variations in the rate of presentation of digital audio can make speech unintelligible, or a variation in rate of delivery of video frames from a scientific visualization application can distort the motion content of the visual information. The digital audio and video applications present continuous demands for large amounts of processing and data transfer resources. Therefore, a high-speed bus is required that can support the timeliness requirements associated with time-critical media applications.

SUMMARY OF THE INVENTION

A computer system includes bus bandwidth management for the operation of a high-speed bus. The high-speed bus is coupled to a plurality of modules. A plurality of client applications operate on the computer system, and request services from the high-speed bus to transfer data from a source module to at least one destination module. The bus bandwidth management system contains a bus manager, a dispatcher, a global controller, and a local controller contained on each module. The high-speed bus comprises a high-speed control bus (HSCB), and a high-speed data bus (HSDB). For any particular transfer request by a client application, a source module and at least one destination module are identified. The bus manager is configured to receive transfer requests from the client applications. The bus manager is coupled to a dispatcher, and in turn, the dispatcher is coupled to the global controller. The dispatcher and the global controller operate in conjunction to perform bus arbitration and the dispatching of individual transfer operations. The global controller is coupled to the HSCB for setting up a plurality of bus transfer operations.

Transfer requests for data transfer on the high-speed bus are made from the client applications to the bus manager. The transfer requests include information defining the module containing data for transfer (i.e. the source module), the module or modules that contain the memory area to receive the data transfer (i.e. the destination module(s)), a description of a two dimensional region of memory comprising data for transfer, a description of a two dimensional memory region for receiving the data transferred, and the importance and urgency information associated with the particular transfer request. The bus manager takes the given request information and, based on the bus management policy in effect, creates a schedule (i.e., a transfer order) for the transfer requests. In a preferred embodiment of the present invention, a time-driven resource management (TDRM) policy is used to perform the schedule of bus transfers. In general, the TDRM policy involves an attempt to schedule all outstanding transfers in the shortest-deadline-first order based on the urgency information. A test for a bus overload condition is performed and, if the bus overload condition is present, the servicing of some transfer requests are deferred, based on the importance of the requests.

Upon determining the transfer order for the transfer requests, the bus manager transfers the ordered set of transfer requests to the dispatcher. The dispatcher decomposes the ordered transfer requests into individual bus transfer operations. Each individual bus transfer operation contains a command for the global controller, source and destination modules. For each individual bus transfer operation, the dispatcher loads the global controller command into the global controller, the source module command packet into the source module, and the destination module command packet into the destination module(s). After the dispatcher dispatches all individual bus transfer operations for a given transfer request, the dispatcher returns to the bus manager to receive the next transfer request. The global controller executes the commands in its command queue, in the transfer order, to effectuate all individual bus transfer operations.

BRIEF DESCRIPTION OF THE DRAWINGS

The objects, features, and advantages of the present invention will be apparent from the following detailed description of the preferred embodiment of the invention with references to the following drawings.

NOTION AND NOMENCLATURE

Figure 1:
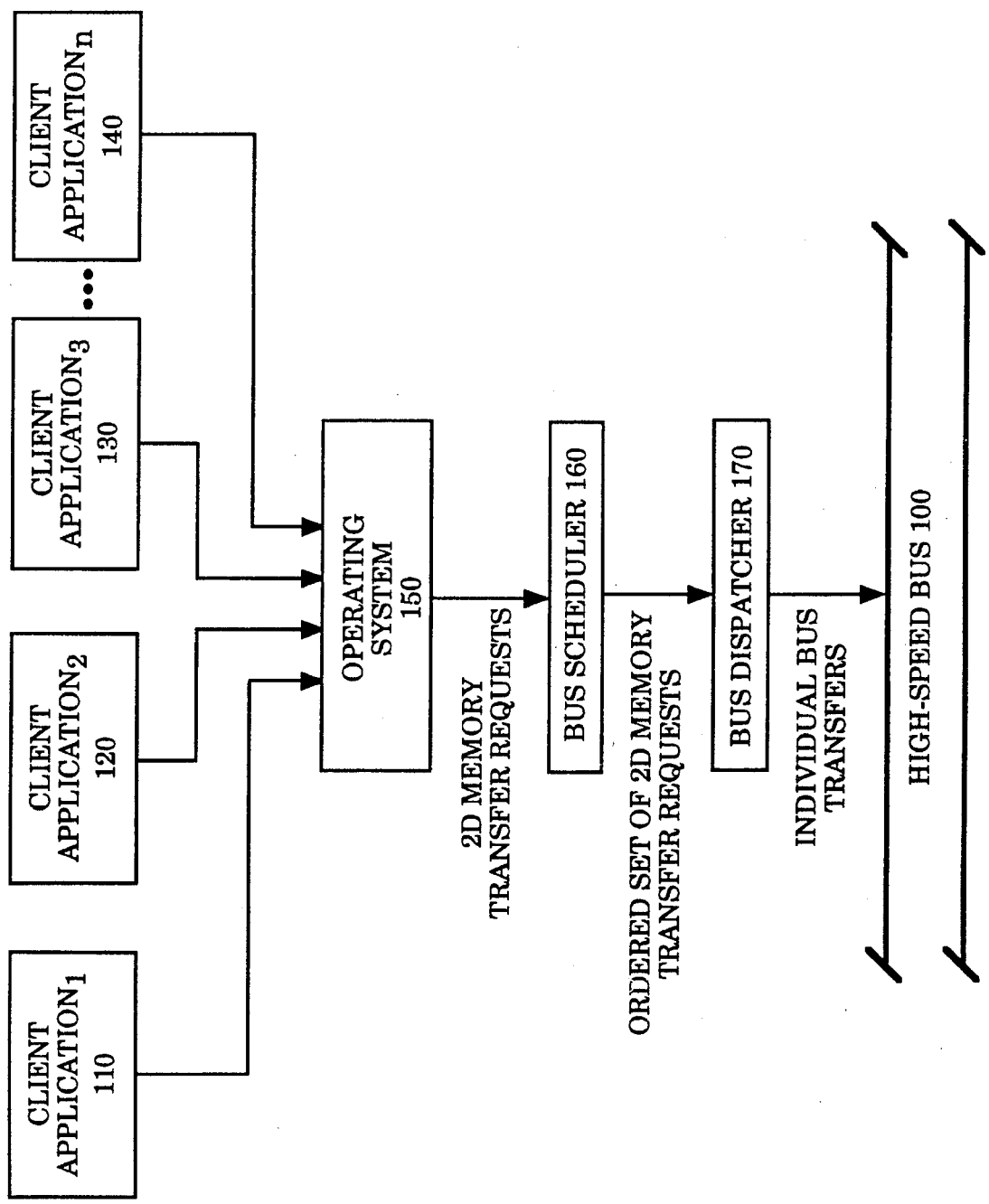
FIG. 1 illustrates a high-level block diagram for bus bandwidth management configured in accordance with the present invention.

The detailed descriptions which follow are presented largely in terms of algorithms and symbolic representations of operations within a computer system. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases there should be borne in mind the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below. Machines which may perform the functions of the present invention include those manufactured by Sun Microsystems, Inc., as well as other manufacturers of computer systems.

DETAILED DESCRIPTION

Methods and apparatus for bus bandwidth management are disclosed. In the following description, for purposes of explanation, specific nomenclature is set forth to provide a thorough understanding of the present invention. However, it will be apparent to one skilled in the art that these specific details are not required to practice the present invention. In other instances, well known circuits and devices are shown in block diagram form to avoid obscuring the present invention unnecessarily.

In order to effectively support time-critical media applications, a computer system must deliver resources to meet the timeliness requirements imposed by the underlying applications. With time-critical media applications, individual data items contain end-to-end time constraints, and failure to meet these time constraints may result in incorrect behavior of the applications. For example, a NTSC video player program must digitize, buffer, process, transfer, and display video frames at 30 frames per second to avoid lost frames, noticeable interflame jitter, tearing of frames, or other display inconsistencies. In addition to these inherent time constraints, applications can impose additional time constraints on the media stemming from such activities as interactive control and synchronization. In time-critical media applications, a number of system resources are required to perform the desired operations. In addition, the computer system must ensure that all the resources needed to complete computations and manipulations of time-critical media are available to the proper portions of the computation at the proper time. In particular, in an audio/video application, I/O bus resources are of considerable importance, because much of the time-critical media application involves transferring large amounts of continuous information within the system.

Because time-critical media applications require large amounts of I/O bus resources, an underlying computer system requires high utilization of I/O bus resources. Optimally, high utilization of the bus results from data transfer being done during all I/O bus clock cycles. However, in reality, one hundred percent bus utilization is difficult to obtain. As will be explained, the present invention provides high bus utilization through effective bus bandwidth management. When it is not possible to deliver one hundred percent utilization of the bus, the present invention provides a means for graceful degradation. In order to support a policy of graceful degradation, the bus bandwidth management system of the present invention determines which application to deprive of bus I/O resources. For example, in most applications, the outright loss of a frame of video is more desirable than late display of the video frame because late display causes late display of subsequent video frames. In this example, a new frame will be available soon after the loss of the video frame.

In addition, the bus bandwidth management system detects when the system lacks the resources needed to meet all of the time constraints for the application, a condition known as overload, and executes the appropriate degradation policy for the overload condition. In general, the bus bandwidth management system of the present invention denies a request for service from some applications so as to deliver the greatest overall system performance possible when the system is overloaded. The graceful degradation policy of the present invention results in the fewest number of applications, having the lowest value to the system, denied service (or having the level of service reduced) during overload conditions. To meet the goals of high utilization with graceful degradation, the present invention provides a means for specifying timelessness and importance attributes for each application.

Referring to FIG. 1, a high-level block diagram for bus bandwidth management configured in accordance with the present invention is illustrated. A plurality of client applications, designated 110, 120, 130 and 140, operate in the computer system, and the client applications utilize a high-speed bus 100. In a preferred embodiment, some client applications manipulate and compute data consisting of time-critical media. In order to utilize the high-speed bus 100 resource, the client applications interact with an operating system 150. In addition to managing a number of computer system resources, the operating system 150 allocates the high-speed bus 100 to the client applications. In order to obtain high bus utilization and graceful degradation when necessary, the client applications contain urgency and importance information along with each request for use of the high-speed bus 100. In general, the urgency and importance information is provided to a bus scheduler 160 via the operating system 150.

The bus scheduler 160 schedules transfer requests from the client applications for use of the high-speed bus 100. In a preferred embodiment of the present invention, the bus scheduler is performed in software and is described more fully below. In general, the bus scheduler 160 orders the transfer requests based on a bus management policy using the importance and urgency information provided from each requesting client application. Upon ordering of the transfer requests, the bus scheduler 160 transfers the ordered set of requests to a bus dispatcher 170. The bus dispatcher 170 is coupled to the high-speed bus 100. The bus dispatcher 170 provides a lower level function such that each individual transfer request is dispatched on the high-speed bus 100 in the order scheduled by the bus scheduler 160. In a preferred embodiment of the present invention, the bus dispatcher 170 is performed in both hardware and software.

Figure 2:
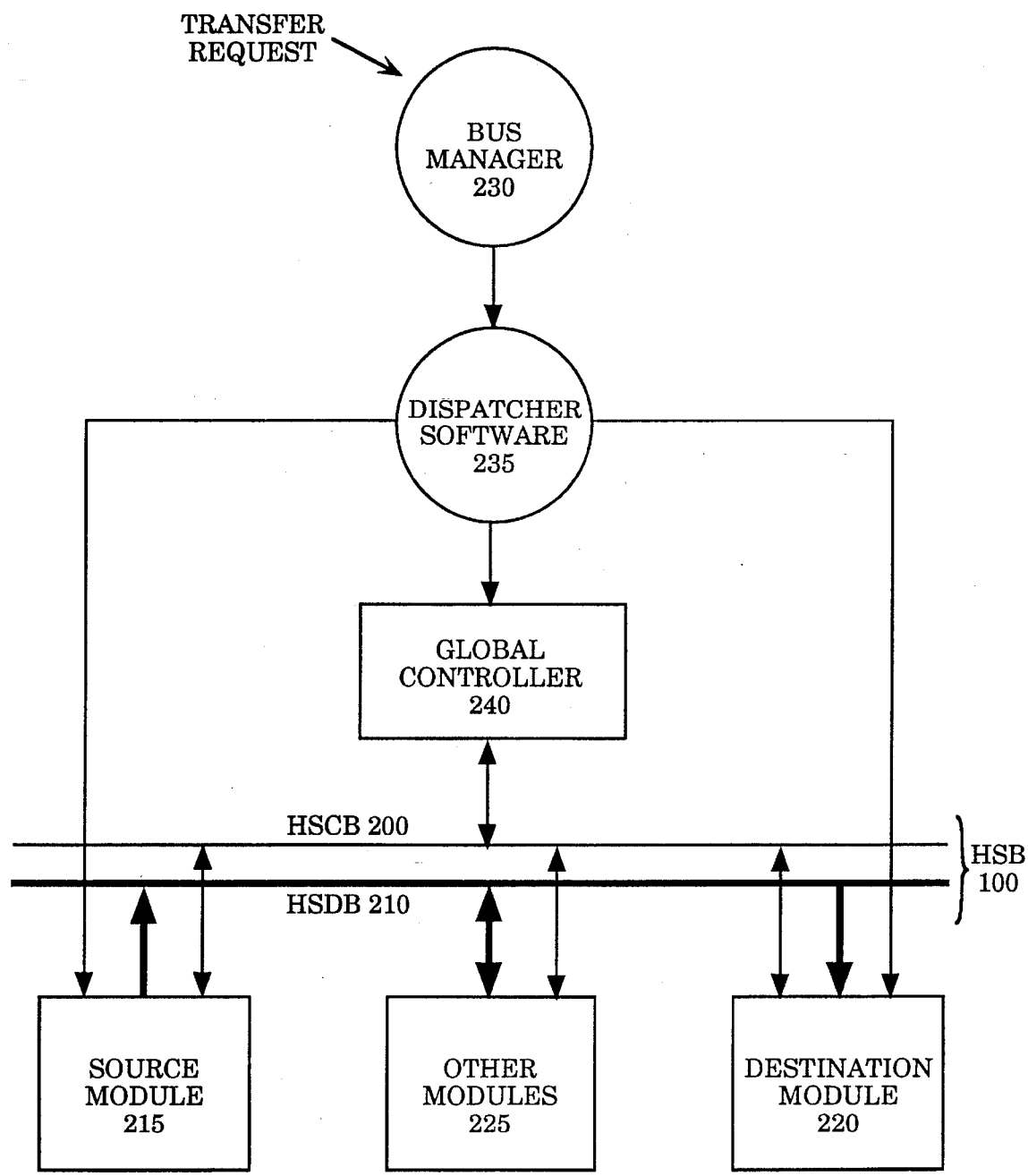
FIG. 2 illustrates a high-level block diagram of a high-speed bus configured in accordance with the present invention.

Referring to FIG. 2, a high-level block diagram of a high-speed bus configured in accordance with the present invention is illustrated. The high-speed bus 100 comprises a high-speed control bus (HSCB) 200 and a high-speed data bus (HSDB) 210. In general, the high-speed bus 100 couples a plurality of modules. For any particular transfer request, a source module and at least one destination module is identified. For the example shown in FIG. 2, source module 215 transfers data over the HSDB 210 to a destination module 220. As will be appreciated by one skilled in the art, any number of modules could be connected to the high-speed bus 100. For the example illustrated in FIG. 2, other modules 225 represents additional modules not involved in the particular data transfer. In a preferred embodiment, the bus management scheduling is performed by a bus manager 230. The bus manager 230 is configured to receive transfer requests from the client applications. The bus manager 230 is coupled to a dispatcher 235, and in turn, the dispatcher 235 is coupled to the global controller 240. The dispatcher 235 and the global controller 240 operate in conjunction to perform bus arbitration dispatching. The global controller 240 is coupled to the HSCB 200 for setting up a plurality of bus transfer operations.

Figure 3:
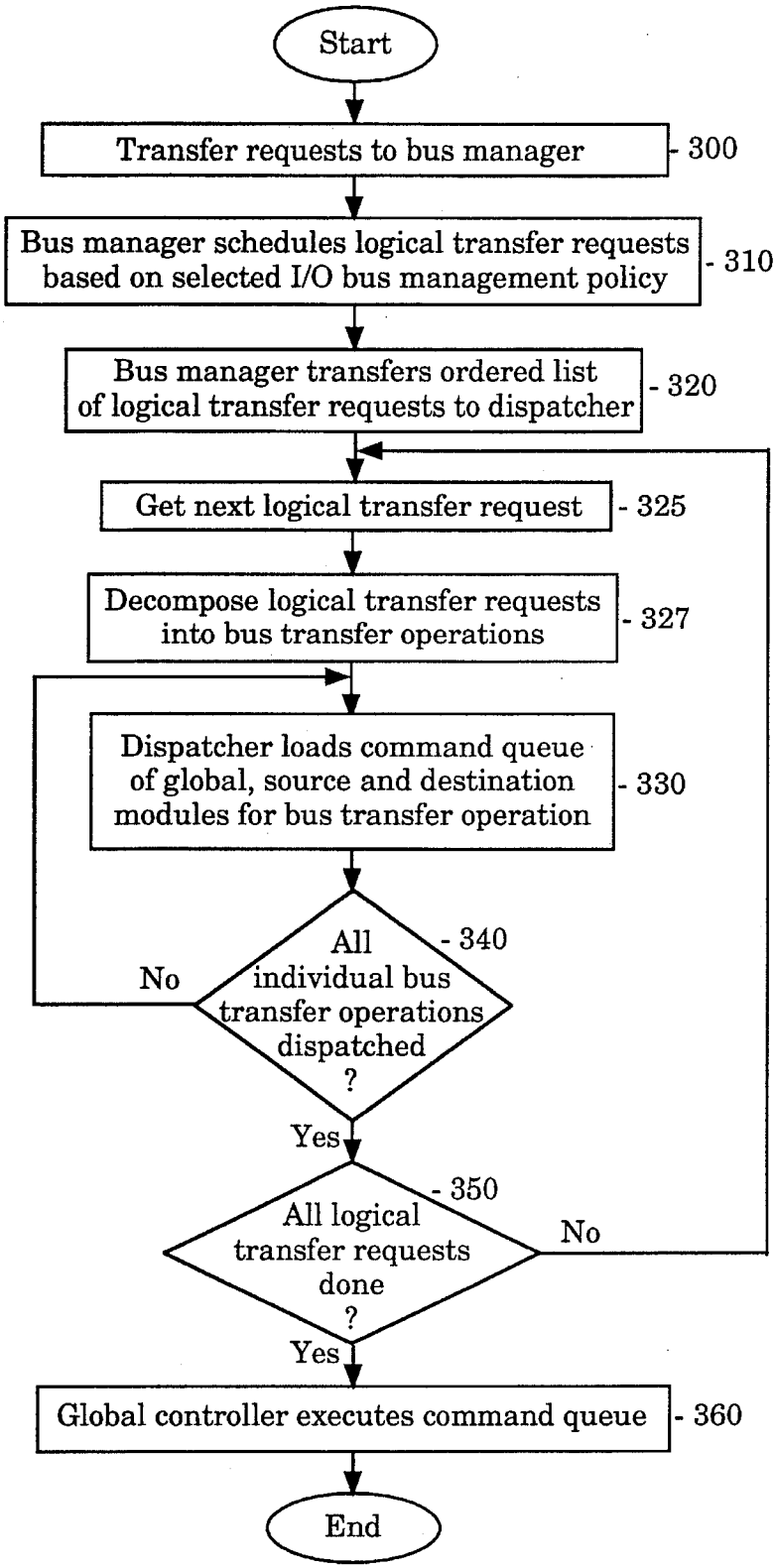
FIG. 3 illustrates a flow diagram for the present invention method of bus bandwidth management.

Referring to FIG. 3, a flow diagram for the present invention method of bus bandwidth management is illustrated. In block 300, the client application issues a transfer request for data transfer to the bus manager on the high-speed bus. The transfer requests include information defining the module containing data for transfer (i.e. the source module), the module or modules that contain the memory area to receive the data transfer (i.e. the destination module(s)), a description of a two dimensional region of memory comprising data for transfer, a description of a two dimensional memory region for receiving the data transferred, and both the importance and urgency information associated with the particular transfer request. As discussed above, the time constraints comprise urgency information. The bus manger takes the requested information and, based on the I/O bus management policy management in effect, schedules a transfer order for the transfer requests as shown in block 310. In a preferred embodiment of the present invention, a Time Driven Resource Management (TDRM) policy is used. In general, the TDRM policy involves an attempt to schedule all outstanding transfers in the shortest-deadline-first order based on the urgency information. A test for a bus overload condition is performed, and if the bus overload condition is determined to be present, the servicing of selected transfer requests is deferred.

Upon determining the transfer order for the transfer requests, the bus manager transfers the ordered transfer requests to the dispatcher as shown in block 320. The dispatcher retrieves the next logical transfer request, and decomposes the ordered transfer requests into individual bus transfer operations as shown in blocks 325 and 327, respectively. Each individual bus transfer operation contains command packets for the global controller, source and destination modules. A command packet for the source module contains a starting memory address, a count of the number of data words for transfer, and an indication that the transfer operation is a read operation. The destination module command packet contains a starting memory location, a count of the number of words that the destination module receives, and an indication that the transfer operation is a write operation. Also, the global controller command packet contains the source and destination module identifiers.

In order to generate the command packets, the dispatcher utilizes the source and destination rectangular descriptions provided by the bus manger. For each individual bus transfer operation, the dispatcher loads the global controller command packet into the global controller, the source module command packet into the source module, and the destination module command packet into the destination module(s) as shown in block 330. As illustrated in block 340, if all the individual bus transfer operations are not dispatched, then the dispatcher loads the command queue of the global, source and destination modules for next bus transfer operation. Alternatively, if all the individual bus transfer operations are dispatched, then the dispatcher determines whether all logical transfer requests are serviced as shown in block 350. If all logical transfer requests are not serviced, then the dispatcher retrieves the next logical transfer request. As shown in block 360, the global controller executes its command queue, in the transfer order, to effectuate all individual bus transfer operations as will be described more fully below.

Figure 4B:
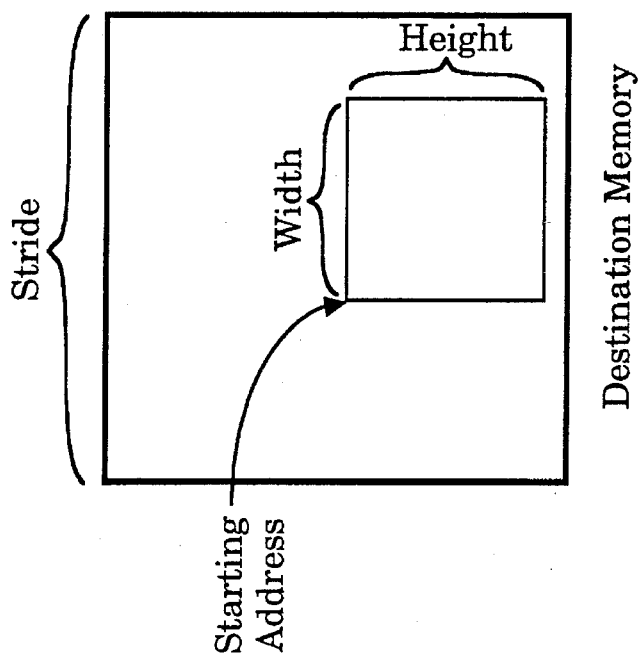
FIGS. 4a–b illustrate the two dimensional memory addressing scheme used in a preferred embodiment of the present invention.
Figure 4A:
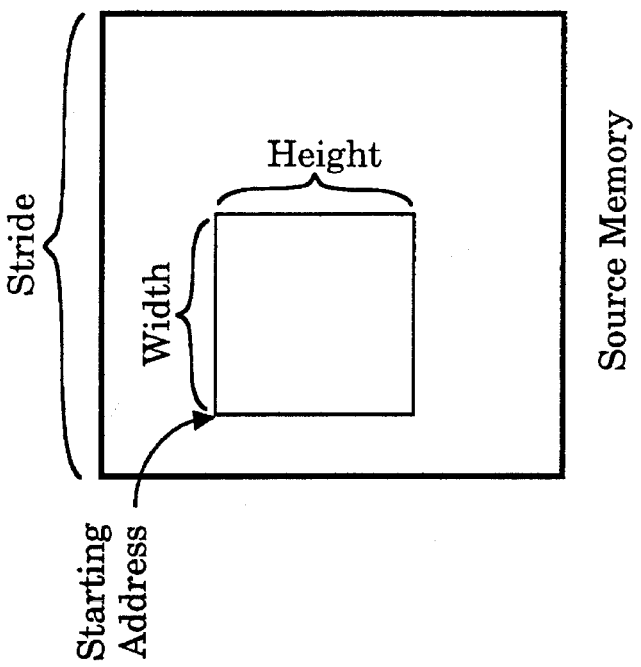

In order to support bus bandwidth management in accordance with the present invention, the operating system 150 (FIG. 2) provides a message-passing facility that client applications utilize to transmit transfer requests to the bus scheduler. In addition, the message-passing facility is utilized by the bus scheduler to send responses to the client applications. To initiate a bus transfer operation, a client application program allocates, composes and transmits a bus transfer request message to the bus scheduler for each transfer request. The bus transfer request messages contain information identifying two dimensional specifications of the source and destination memory locations associated with the transfer request. In addition, bus transfer request messages contain time constraint information associated with the transfer request. The memory source and destination specifications include a starting memory address, that defines the upper left hand corner of a rectangular memory region, the width of the memory region, the height of the memory region, and a stride (i.e., the width of the enclosing memory region). FIGS. 4a–b illustrate the two dimensional memory addressing scheme used in a preferred embodiment of the present invention. FIG. 4a illustrates a region of source memory located in the source module, and FIG. 4b illustrates a region of destination memory located in the destination module.

The time constraint information of the bus transfer request message includes urgency information for the transfer request specified relative to a real-time clock of the computer system. In general, the urgency information specifies a deadline time for completion of the bus operation. For time critical client application programs, the deadline or urgency information contains the time limitations associated with the time critical application. In addition to the urgency information, the time constraint information of the bus transfer request message includes importance information. The importance information provides a user-defined priority for the transfer request specified as a global priority.

The bus transfer request message also contains a response field allowing the client application to identify a destination for receipt of a corresponding reply message from the bus scheduler. After the bus scheduler completes processing a bus transfer request message, the bus scheduler sends a reply message to a destination specified by the response field. The reply message contains an identifier that allows the receiving client application program to determine the origin of the bus transfer. In addition, the reply message includes a transfer request status for the corresponding transfer request. In general, the transfer request status indicates completion or failure of the transfer operation. If the client application program does not desire a reply from the bus scheduler, then the client application program leaves the response field in the bus transfer request message empty. Alternatively, if the client application program desires a reply from the bus scheduler, then the client application program writes an address, in the response field location, to specify the destination. The address may identify either the client application program issuing the transfer request or another client application program for which receipt of the reply message is desired.

Figure 5:
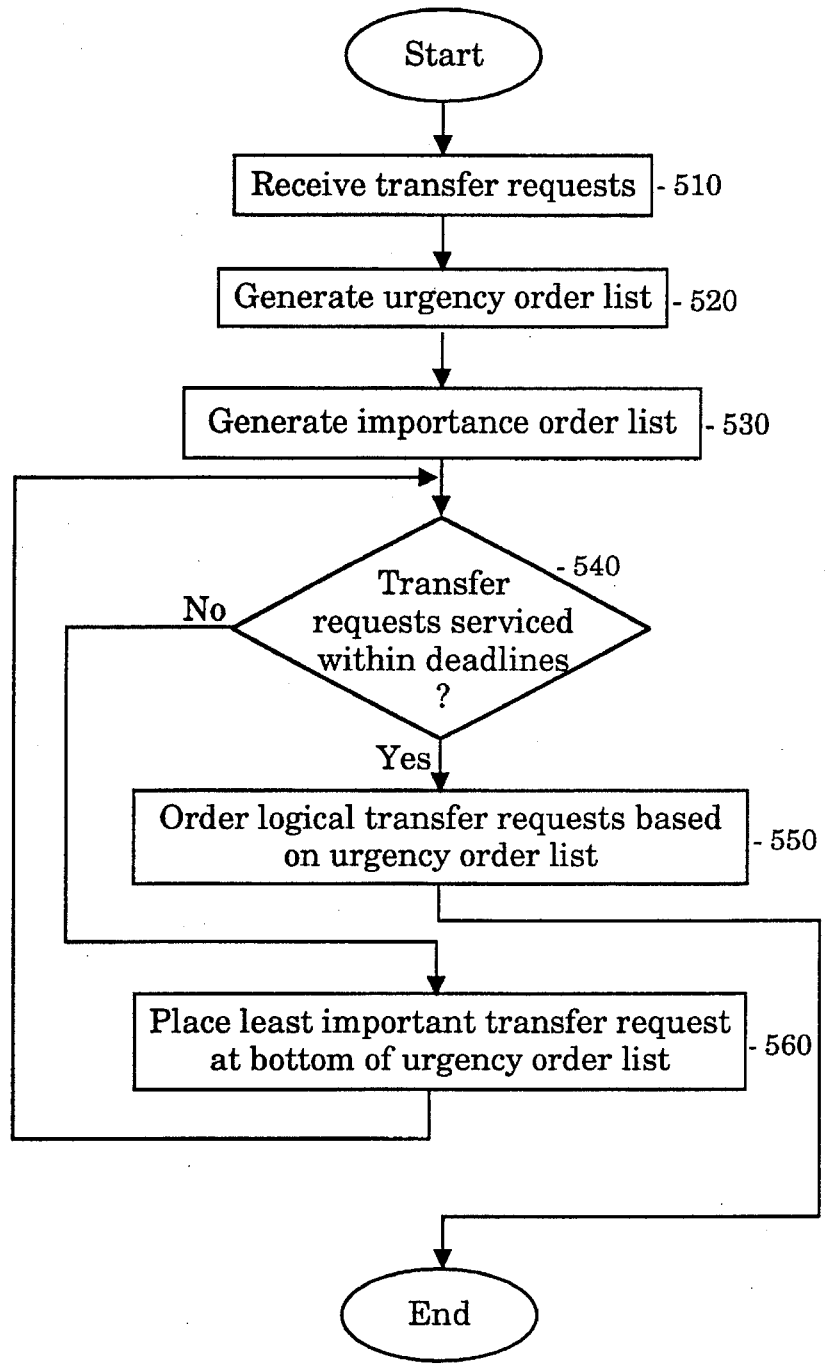
FIG. 5 illustrates a flow diagram for a TDRM bus resource management policy.

In a preferred embodiment of the present invention, the bus scheduler utilizes a time driven resource management (TDRM) policy to allocate bus resources. Referring to FIG. 5, a flow diagram for a TDRM bus resource management policy is illustrated. In order to implement the TDRM policy, the bus scheduler maintains an importance list and an urgency order list for incoming transfer requests. Upon receipt of each transfer request, the bus scheduler inserts the transfer request on the importance order list, based on the global priority of the transfer request, and inserts the transfer request on the urgency order list based on the deadline information received as shown in blocks 510, 520 and 530, respectively. In accordance with the TDRM policy, the bus scheduler determines if the bus bandwidth is adequate to service all pending transfer requests within the specified deadline as shown in block 540. To accomplish this task, the bus scheduler constructs a trial comprising deadline-ordered schedule of transfer requests. For the trial, the bus scheduler assumes no additional transfer requests are generated by a client application program, and times calculated for all pending transfer requests are determined based on the size of the transfer request.

If the bus bandwidth is adequate, then the bus scheduler utilizes the urgency order list as the order for the logical transfer requests as shown in block 550. Subsequently, the bus scheduler issues the ordered logical transfer requests to the dispatcher. Alternatively, if the bus bandwidth is not adequate to service all pending transfer requests within the corresponding deadlines, then the bus scheduler re-orders the urgency order list by removing the least important transfer request as shown in block 560. Specifically, the least important transfer request is placed at the bottom of the urgency order list. If the bus scheduler determines that the bus bandwidth is sufficient to service the remaining transfer requests on the re-ordered urgency list, then the bus scheduler dispatches the logical transfer requests to the dispatcher based on the newly reordered urgency list. Otherwise, the process, illustrated by blocks 540, 550 and 560, is executed until a logical transfer request list is generated that permits servicing of the largest number of the most important transfer requests. After the bus scheduler issues the logical transfer requests to the dispatcher, the bus scheduler waits for a response from the dispatcher that indicates completion or failure of the bus operations. The bus scheduler then sends a reply message to the specified client application program, removes the corresponding transfer request from the urgency and importance lists, and instructs the dispatcher to execute the next transfer.

Figure 6:
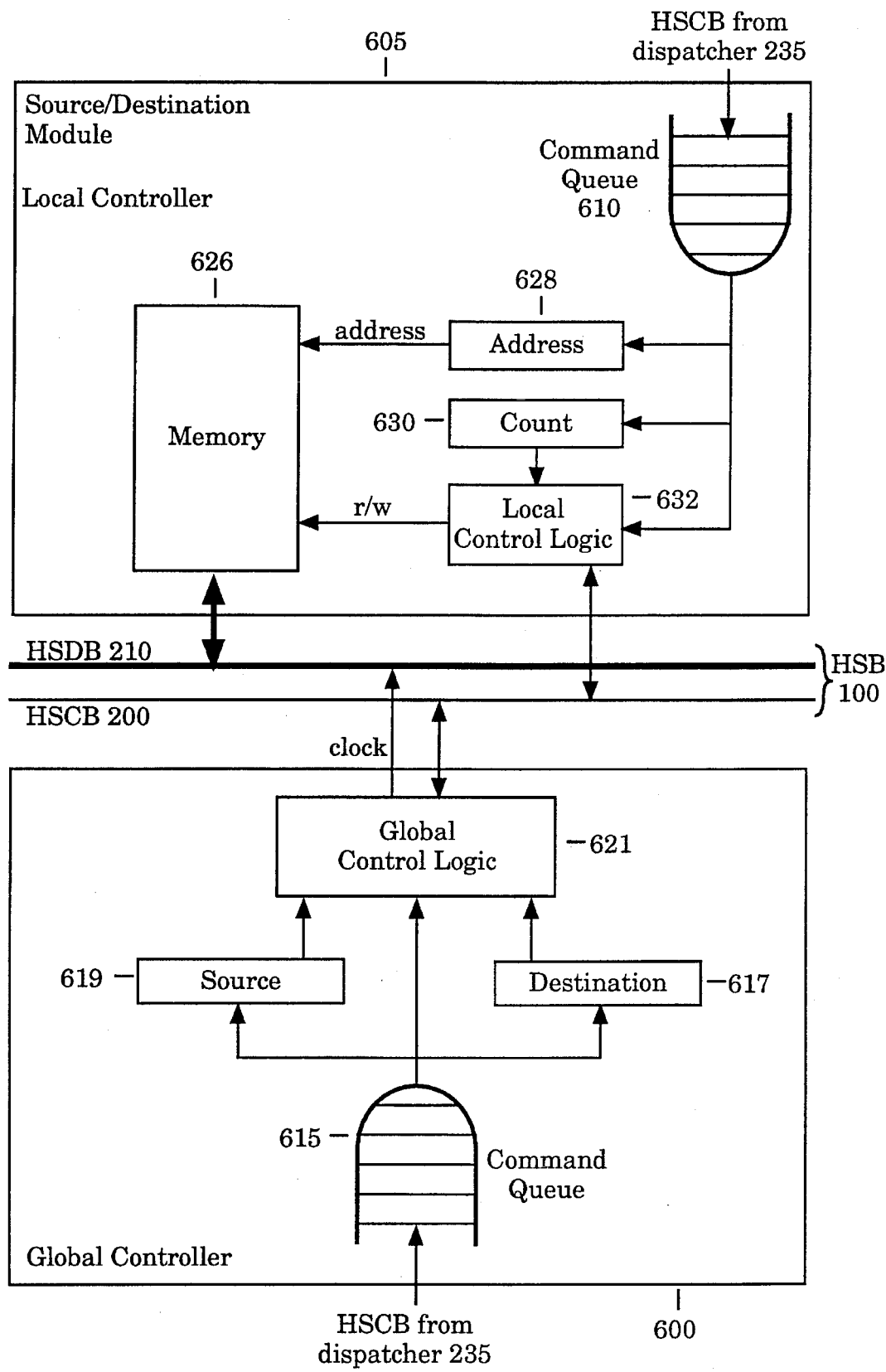
FIG. 6 illustrates a block diagram of a global controller and local controller configured in accordance with the present invention.

Referring to FIG. 6, a block diagram of a global bus controller and local controllers for source and destination modules configured in accordance with the present invention is illustrated. For purposes of explanation, a local controller 605 for a single source/destination module is illustrated in FIG. 6. However, each module coupled to the high-speed bus 100 comprises a local controller such as local controller 605. The local controller 605 in each source/destination module contains a command queue 610, an address and count registers 628 and 630, a memory 626, and local control logic 632. The command queue 610 is arranged as a first-in-first-out (FIFO) device. The command queue 610 stores the source/destination command packets transferred from the dispatcher 235. Because the command queue 610 is arranged as a FIFO device, the source and destination command packets are stored in the transfer order.

Also shown in FIG. 6 is a global controller 600. The global controller 600 contains a command queue 610, also coupled to the dispatcher 235 through the HSCB 200. The command queue 615 is also a FIFO device such that global controller command packets are stored in the order dispatched (i.e. the transfer order). The global controller 600 also contains source and destination registers 619 and 617, respectively, and global control logic 621. The command queue is coupled to the source and destination registers 619 and 617 to store source and destination identifiers for each bus transfer operation. The global control logic 621 is coupled to the HSCB 200, and generates signals to effectuate bus transfer operation. The global control logic 621 comprises a high-speed bus clock (HSBCLK) for providing timing for the HSDB 210. In a preferred embodiment, the clock comprises a 20 megahertz (MHz) frequency. The operation of the global control logic 621 is described more fully below.

Through the command queues on the local and global controller modules, the present invention provides for set-up of N bus transfer operations, wherein N is greater than one. As discussed above, the command packets are dispatched on HSCB 200. In this way, the present invention overlaps the set-up of bus operations over the HSCB 200 with the transfer of data. The ability to set up N bus transfer operations is quantitatively better than merely setting up one transfer. The setting up of N bus transfer operations permits the high level intelligent bus bandwidth management of the present invention. Typically, a bus exhibits up to 50% reduction in bus bandwidth resulting from time required for set-up which translates into idle time on the data transfer bus. In a preferred embodiment of the present invention, the command queues of the local and global controller modules support up to 64 bus transfer operations. In addition, mechanisms exist to indicate the degree of fullness of the queues so that the software controls over-running and under-running into the queues.

The global controller of the present invention generates a plurality of signals transferred on the HSCB 200. In addition to the clock (HSBCLK) described above, the global controller generates high-speed bus select (HSBSEL) signals, and a high-speed run (HSBRUN) signal. The HSBSEL signals indicate to each local control logic within each source/destination module whether the respective module is involved in the current bus transfer operation. Along with the command queues in each source/destination module, the HSBSEL signals permit set-up pending bus operation transfers over the HSCB while another bus transfer operation is executed over the HSDB. The HSBRUN signal is asserted to indicate to the source module that data transfer may begin. The source module continues to supply data on the high-speed data bus for each HSBCLK cycle for which HSBRUN is asserted.

The local controllers on the source/destination modules also generate a plurality of signals over the HSCB. The HSBDQ* signal indicates that valid data is on the HSDB. The HSBDQ* signal allows for various sources on the HSDB to have different pipeline delays following the assertion of the HSBRUN signal. At the beginning of a bus transfer operation, after the assertion of the HSBRUN signal, the destination module waits for the HSBDQ* signal to indicate when to start writing. While HSBDQ* is asserted, a write operation occurs on each HSBCLK cycle. The local controller also assert a HSBNOTRDY* signal. When a source/destination module is selected by the assertion of a HSBSEL* signal, the local controller on the selected source/ module asserts the HSBSEL* signal, and holds the HSBSEL* signal active until ready for data transfer. The time delay permits the source/destination to perform local arbitration or video random access memory (VRAM) set-up. When HSBNOTRDY* is deasserted by the source module, and HSBRUN is asserted, data is supplied from the source module onto the HSDB. In addition, the present invention permits the source and destination modules to stall data transfer. To accomplish this, a HSBSTL* signal is activated to stop all bus activity during a HSDB transfer. The HSBSTL stall function is used when either the source or destination can not continue to respond in accordance with the bus transfer operation. For example, the source/destination module may perform DRAM refresh, lose re-arbitration of a resource, or contain a lack of data.

Figure 7:
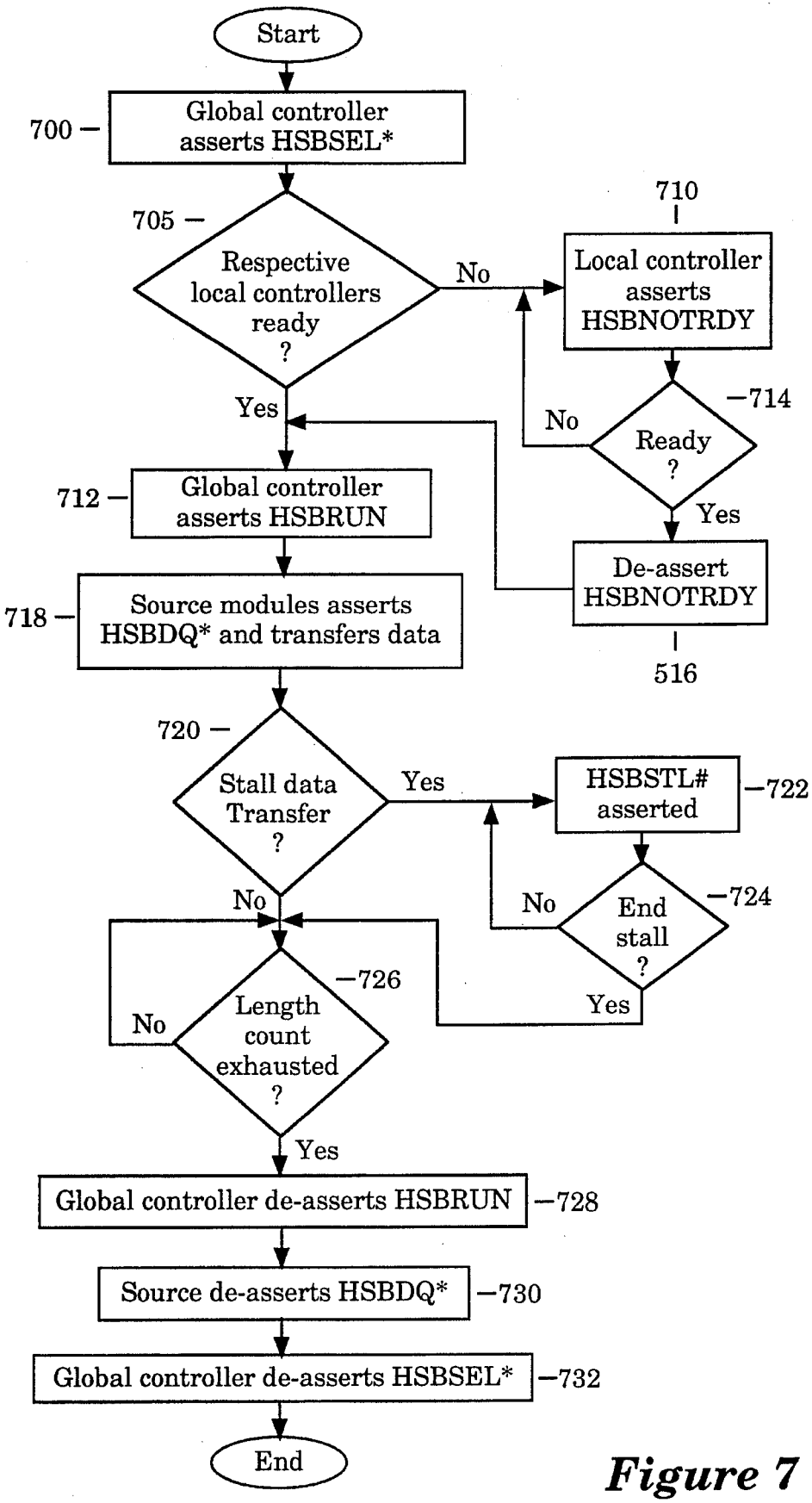
FIG. 7 illustrates a flow diagram for a method of bus transfer operation configured in accordance with the present invention.
Figure 8:
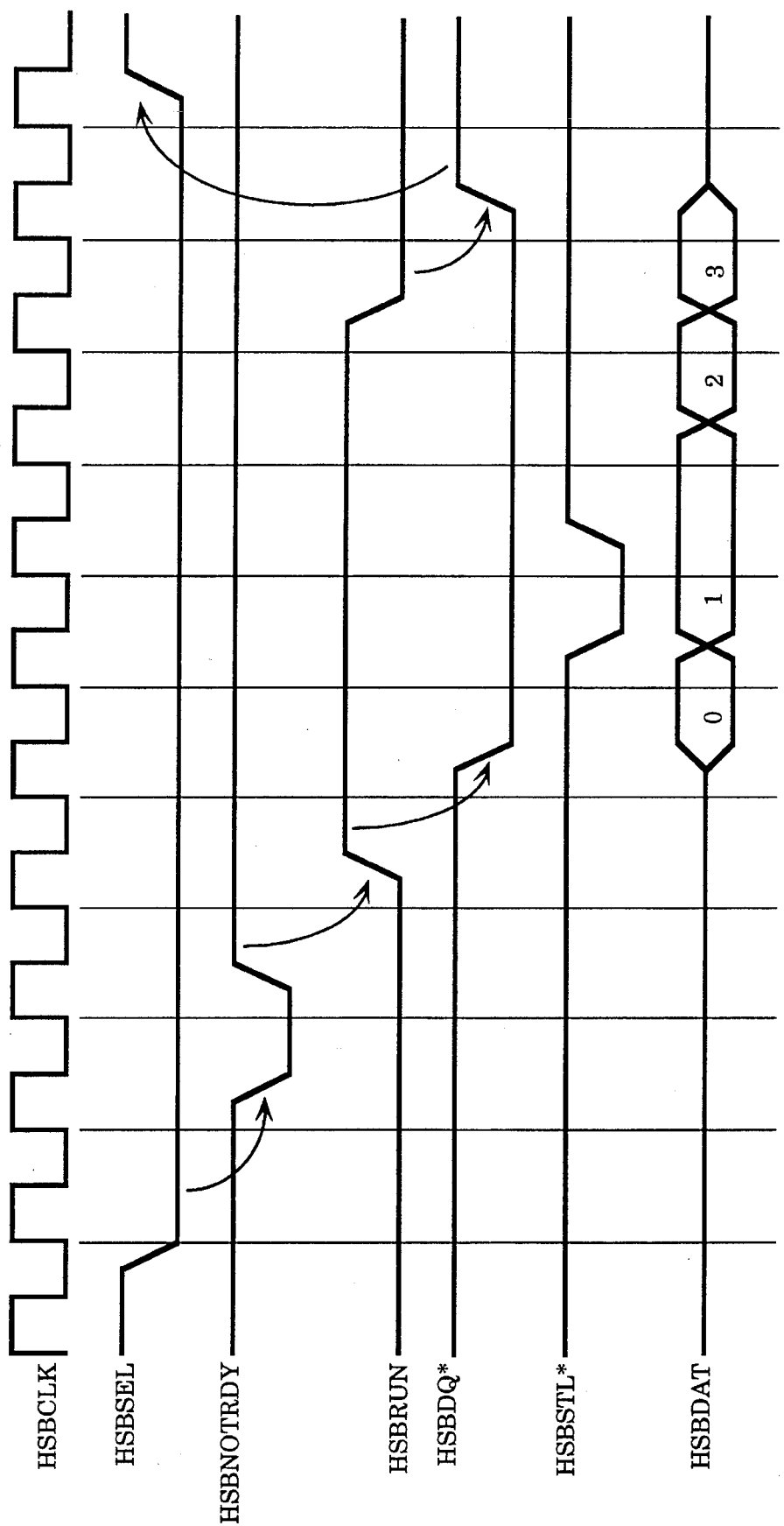
FIG. 8 illustrates a timing diagram representing the signal relationships for a bus transfer operation configured in accordance with the present invention.

In FIG. 7, a flow diagram for a method of bus transfer operation configured in accordance with the present invention is illustrated. In FIG. 8, a timing diagram for a bus transfer operation configured in accordance with the present invention is illustrated. Referring to FIG. 7, in order to effectuate a bus transfer operation, the global control logic 621 asserts the HSBSEL* signal as shown in block 700. The HSBSEL* signal selects the appropriate source and destination modules for the bus transfer operation. If the selected source/destination modules are not ready, the local control logic 632 for the respective source/destination module asserts an HSBNOTRDY signal as shown in blocks 705 and 710. The signal remains asserted until the local control logic is ready for bus transfer operation. When the source/destination module is ready for bus transfer operation, the global control logic 621 asserts the HSBRUN signal as shown in blocks 714 and 716.

In response to the HSBRUN signal, the selected source module asserts HSBDQ*, and subsequently transfers data on the HSDB as shown in blocks 712 and 718. As described above, the source or destination module may stall data transfer. As illustrated blocks 720, 722 and 724, if the source or destination module desires to stall, the HSBSTL* is asserted until the source/destination module resumes data transfer. Data is transferred from the source module memory to the destination module memory until the length count is exhausted as shown in block 726. The source module is responsible for transferring data onto the HSDB while monitoring the HSBSTL* signal. The source module is finished with the current bus transfer operation when the last data word is supplied to the HSDB. At the end of the bus transfer operation, the destination module is responsible for emptying its pipeline of valid data even if the HSBDQ* signal is de-asserted. The HSBDQ* should not be deasserted until the end of the data transfer. After data transfer is complete, the global control logic 621 deasserts the HSBRUN as shown in block 730. In response, the local controller on the source module deasserts HSBDQ*, and the global control logic deasserts HSBSEL* as shown in blocks 730 and 732, respectively.

Figure 9:
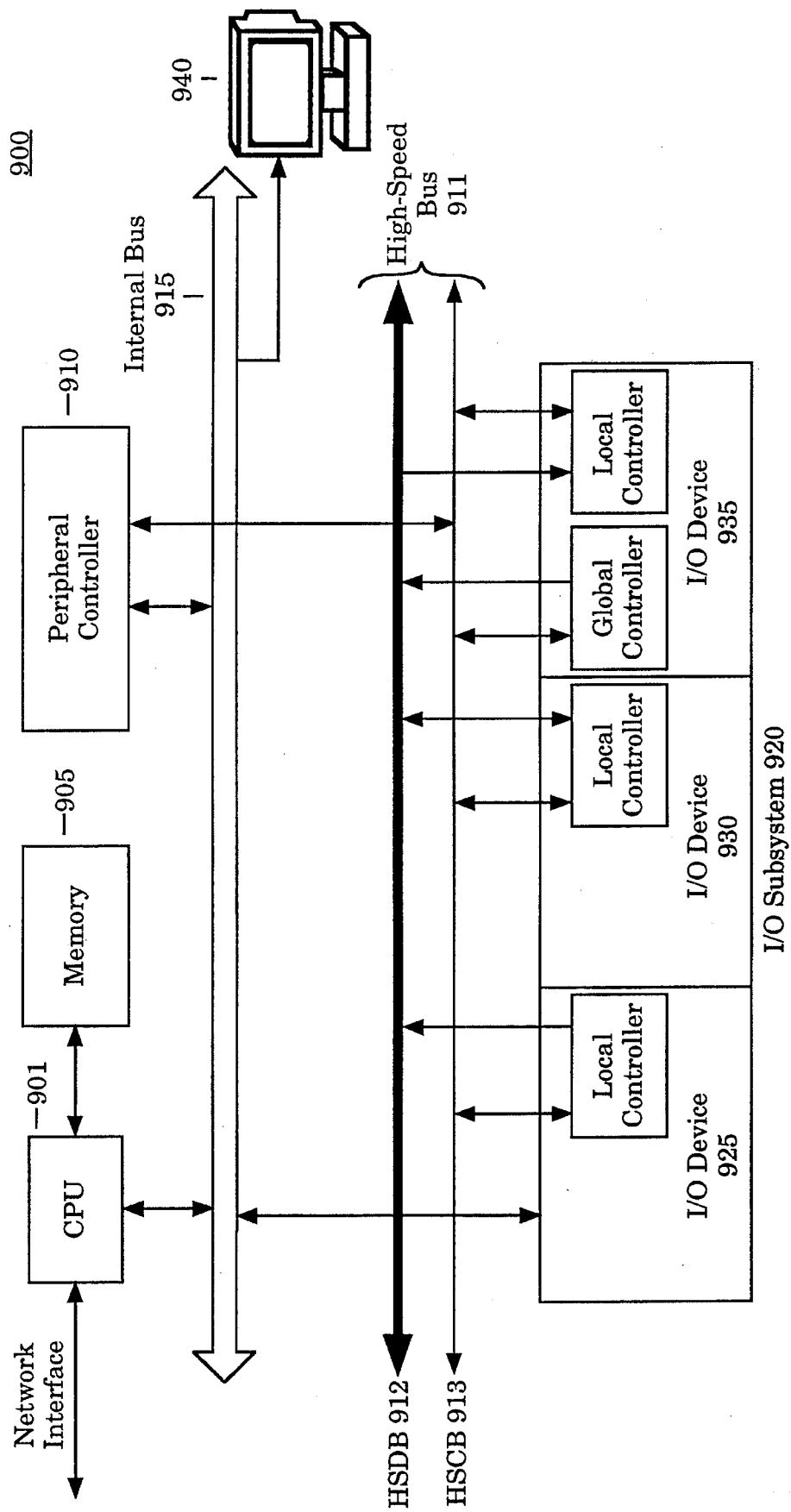
FIG. 9 illustrates a computer system incorporating a high-speed bus of the present invention.

Referring to FIG. 9, a computer system comprising a high-speed bus configured in accordance with the present invention is illustrated. A computer system 900 comprises a central processing unit (CPU) 901, coupled to a memory 905. In addition, the computer system 900 contains a peripheral controller 910 for interfacing a number of devices to the computer system 900. The CPU 901 communicates with the peripheral controller 910 through an internal bus 915. The computer components shown in FIG. 9 are those typically found in a computer system, and in fact the computer system 900 is intended to represent a broad category of data processing devices. The computer system 900 also contains a high-speed bus 911, wherein the high-speed bus 911 contains a high-speed data bus (HSDB) 912 and a high-speed control bus (HSCB) 913. In a preferred embodiment, the HSDB 912 contains a 128 bit wide data path. With a 128 bit data bus, the HSDB 912 results in a maximum bandwidth of 320 mega bytes per second peak transfer rate.

In the computer system 900, the high-speed bus 911 couples a plurality of I/O devices 925, 930, and 935 contained in an I/O subsystem 920. The I/O devices may perform a variety of functions requiring high speed data transfer. For example, the high-speed bus of the present invention has application for high speed data transfer to accommodate time-critical media applications. Each I/O device comprises a local controller. In addition, I/O device 935 comprises a global controller. As described above, commands are dispatched on the HSCB 913 to set-up a plurality of bus transfer operations. The bus transfer operations are executed, in the transfer order, by the global controller contained on the I/O device 935 such that data is transferred on the HSDB 912.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A method for bus bandwidth management comprising the steps of:

issuing transfer requests from a plurality of client applications operating on a computer system to effectuate data transfer on a bus, each of said transfer requests specifying urgency and importance information, wherein said urgency information specifies a time deadline for execution of said transfer request and said importance information specifies a priority for said transfer request;

scheduling said transfer requests by ordering said transfer requests, based on a bus management policy that utilizes said urgency and importance information, to generate a transfer order;

dispatching said transfer requests in said transfer order to a command queue by generating individual bus operations; and transferring data via said bus for each individual bus operation in said transfer order.

2. The method as claimed in claim 1, wherein said client applications comprise time-critical media applications wherein correct transfer of said data is a function of time.

3. The method as claimed in claim 1, wherein scheduling said transfer requests for use of said bus based on a bus management policy comprises the steps of:

generating an importance list and an urgency list for each transfer request based on said urgency and importance information;

determining whether said bus comprises enough bus bandwidth to service said transfer requests on said urgency list within said deadline specified for each transfer request;

generating said transfer order corresponding to said urgency list when said bus comprises enough bus bandwidth to service said transfer requests; and re-ordering said urgency list, when said bus does not comprises enough bus bandwidth, to service said transfer requests by removing transfer requests comprising low priorities until said bus comprises enough bus bandwidth to service said remaining transfer requests.

4. The method as claimed in claim 1 wherein the step of dispatching said transfer requests comprises the steps of:

providing a control bus; and dispatching said transfer requests on said control bus to said command queue.

5. The method as claimed in claim 1 wherein the step of issuing transfer requests comprises the steps of:

identifying a source module and a destination module on said computer system when issuing transfer requests from said client applications; and specifying a two dimensional area of memory on said source module for source data, and specifying a two dimensional area of memory on said destination module for transfer of said source data.

6. The method as claimed in claim 5 further comprising the step of providing a local controller for each source and destination module, and a global controller for said bus.

7. The method as claimed in claim 6 wherein the step of dispatching said individual bus operations in said transfer order comprises the steps of:

decomposing said transfer requests into individual bus operations, each individual bus request comprising source, destination and global command packets, said source and destination command packets comprising a starting memory location, word count, read/write indication, and said global command packet comprising source and destination identifiers; and transferring, for each individual bus operation, said source command packet to a queue in said local controller on said source module, said destination command packet to a queue in said local controller on said destination module, and said global command packet to a queue in said global controller.

8. In a computer system comprising a high-speed data bus coupled to a plurality of modules, An apparatus for bus bandwidth management comprising:

a plurality of client applications operating on a computer system for issuing transfer requests to a bus, each of said transfer requests specifying urgency and importance information, wherein said urgency information specifies a time deadline for execution of said transfer request and said importance information specifies a priority for said transfer request;

a bus manager coupled to said client applications for scheduling said transfer requests for dispatch on said bus, said bus manager for receiving said transfer requests and for ordering said transfer requests, based on a bus management policy that utilizes said urgency and importance information, to generate a transfer order;

a command queue;

a bus dispatcher coupled to said bus manager for dispatching said transfer requests in said transfer order to said command queue, and for generating individual bus operations; and a global controller coupled to said command queue for transferring data in said transfer order via said for each individual bus operation.

9. The apparatus as claimed in claim 8, wherein said client applications comprise time-critical media applications wherein correct transfer of said data on said bus is a function of time.

10. The apparatus as claimed in claim 8, wherein said bus manager comprises a Time Driven Resource Management (TDRM) policy manager comprising:

a list generator coupled to said client applications for generating an importance list and an urgency list for each transfer request based on said urgency and importance information;

a bus bandwidth analyzer for determining whether said bus comprises enough bus bandwidth to service said transfer requests on said urgency list within said deadline specified for each transfer request; and transfer request ordering coupled to said bus bandwidth analyzer and said list generator for generating said transfer order corresponding to said urgency list when said bus comprises enough bus bandwidth to service said transfer requests, said transfer request ordering for re-ordering said urgency list, when said high-speed bus does not comprises enough bus bandwidth, and for servicing said transfer requests by removing transfer requests comprising low priorities until said high-speed bus comprises enough bus bandwidth to service said remaining transfer requests.

11. The apparatus as claimed in claim 8, wherein said bus dispatcher comprises a control bus for dispatching said transfer requests on to said command queue.

12. The apparatus as claimed in claim 8, wherein said client applications comprise a data request mechanism for identifying a source module and a destination module on said computer system when issuing transfer requests, for specifying a two dimensional area of memory on said source module for source data, and for specifying a two dimensional area of memory on said destination module for transfer of said source data.

13. The apparatus as claimed in claim 8 further comprising a local controller for each source and destination module.

14. The apparatus as claimed in claim 13, wherein said bus dispatcher further comprises:

a command decomposer for decomposing said transfer requests into individual bus operations, each individual bus request comprising source, destination and global command packets, said source and destination command packets comprising a starting memory location, word count, read/write indication, and said global command packet comprising source and destination identifiers; and a queue coupled to said command decomposer for transferring, for each individual bus operation, said source command packet to a queue in said local controller on said source module, said destination command packet to a queue in said local controller on said destination module, and said global command packet to a queue in said global controller.

15. A computer system comprising:

at least one central processing unit (CPU);

a plurality of modules;

a bus coupling said at least one CPU to said modules;

a plurality of client applications operating on said computer system that issue transfer requests to said bus, each of said transfer requests identifying a source module and a destination module including specifying urgency and importance information for each transfer request, wherein said urgency information specifies a time deadline for execution of said transfer request and said importance information specifies a priority for said transfer request;

a bus manager coupled to said client applications for scheduling said transfer requests for dispatch on said bus, said bus manager for receiving said transfer requests and for ordering said transfer requests, based on a bus management policy that utilizes said urgency and importance information, to generate a transfer order;

a command queue;

a bus dispatcher coupled to said bus manager for dispatching said transfer requests in said transfer order to said command queue, said bus dispatcher for receiving said transfer requests in said transfer order and for generating individual bus operations; and a global controller coupled to said command queue for transferring data from said source module to at least one destination module in said transfer order via said for each individual bus operation.

16. The computer system as set forth in claim 15, wherein said client applications comprise time-critical media applications wherein correct transfer of said data on said bus is a function of time.

17. The computer system as set forth in claim 15, wherein said bus manager comprises Time Driven Resource Management (TDRM) policy manager comprising:

a list generator coupled to said client applications for generating an importance list and an urgency list for each transfer request based on said urgency and importance information;

a bus bandwidth analyzer for determining whether said bus comprises enough bus bandwidth to service said transfer requests on said urgency list within said deadline specified for each transfer request; and transfer request ordering coupled to said bus bandwidth analyzer and said list generator for generating said transfer order corresponding to said urgency list when said bus comprises enough bus bandwidth to service said transfer requests, said transfer request ordering for re-ordering said urgency list, when said bus does not comprises enough bus bandwidth, to service said transfer requests by removing transfer requests comprising low priorities until said bus comprises enough bus bandwidth to service said remaining transfer requests.

18. The computer system as set forth in claim 15, wherein said bus dispatcher comprises a control bus dispatching said transfer requests on to said command queue.

19. The computer system as set forth in claim 15, wherein said client applications comprise a data request mechanism for specifying a two dimensional area of memory on said source module for source data, and for specifying a two dimensional area of memory on said destination module for transfer of said source data.

20. The computer system as set forth in claim 15, further comprising a local controller for each source and destination module.

21. The computer system as set forth in claim 20 wherein said bus dispatcher further comprises:

a command decomposer for decomposing said transfer requests into individual bus operations, each individual bus request comprising source, destination and global command packets, said source and destination command packets comprising a starting memory location, word count, read/write indication, and said global command packet comprising source and destination identifiers; and a queue coupled to said command decomposer for transferring, for each individual bus operation, said source command packet to a queue in said local controller on said source module, said destination command packet to a queue in said local controller on said destination module, and said global command packet to a queue in said global controller.

* * * * *